United States Patent [19]

Ng

[11] Patent Number: 5,125,072
[45] Date of Patent: Jun. 23, 1992

[54] EFFICIENT DATA STORAGE SYSTEM FOR GRAY-SCALE PRINTERS

[75] Inventor: Yee S. Ng, Fairport, N.Y.

[73] Assignee: Eastman Kodak Company, Rochester, N.Y.

[21] Appl. No.: 386,647

[22] Filed: Jul. 31, 1989

[51] Int. Cl.[5] .............................................. G06K 15/00
[52] U.S. Cl. ...................................... 395/112; 395/116
[58] Field of Search ................ 364/519, 520, 235 MS, 364/930 MS; 346/154; 400/65; 358/462; 395/109, 101, 112, 115, 116, 110

[56] References Cited

U.S. PATENT DOCUMENTS

| | | | |
|---|---|---|---|
| 4,549,275 | 10/1985 | Sakonick | 364/521 |
| 4,553,172 | 11/1985 | Yamada et al. | 358/280 |
| 4,618,846 | 10/1986 | Ross et al. | 340/347 DD |
| 4,626,902 | 12/1986 | Yamada | 358/75 |
| 4,837,709 | 6/1989 | Sasaki | 364/519 |

*Primary Examiner*—Arthur G. Evans
*Attorney, Agent, or Firm*—J. Gary Mohr

[57] ABSTRACT

Apparatus and method for producing a page output from electronic input data consisting of text and line graphics information and of pictorial information. The text and graphics information is converted to two-bit per pixel data and stored in a page buffer. The pictorial information is originally stored at its originating pixel resolution and at a bit level sufficient to represent the full color content. This pictorial data is expanded to a finer pixel resolution at a four-bit level, per color, at the time data is to be merged with the text and graphics data. The merging is accomplished in a band or line buffer which combines the two-bit and four-bit data. A location table is used to keep track of the bit level transitions and to signal the output device that the data is in a particular format.

19 Claims, 3 Drawing Sheets

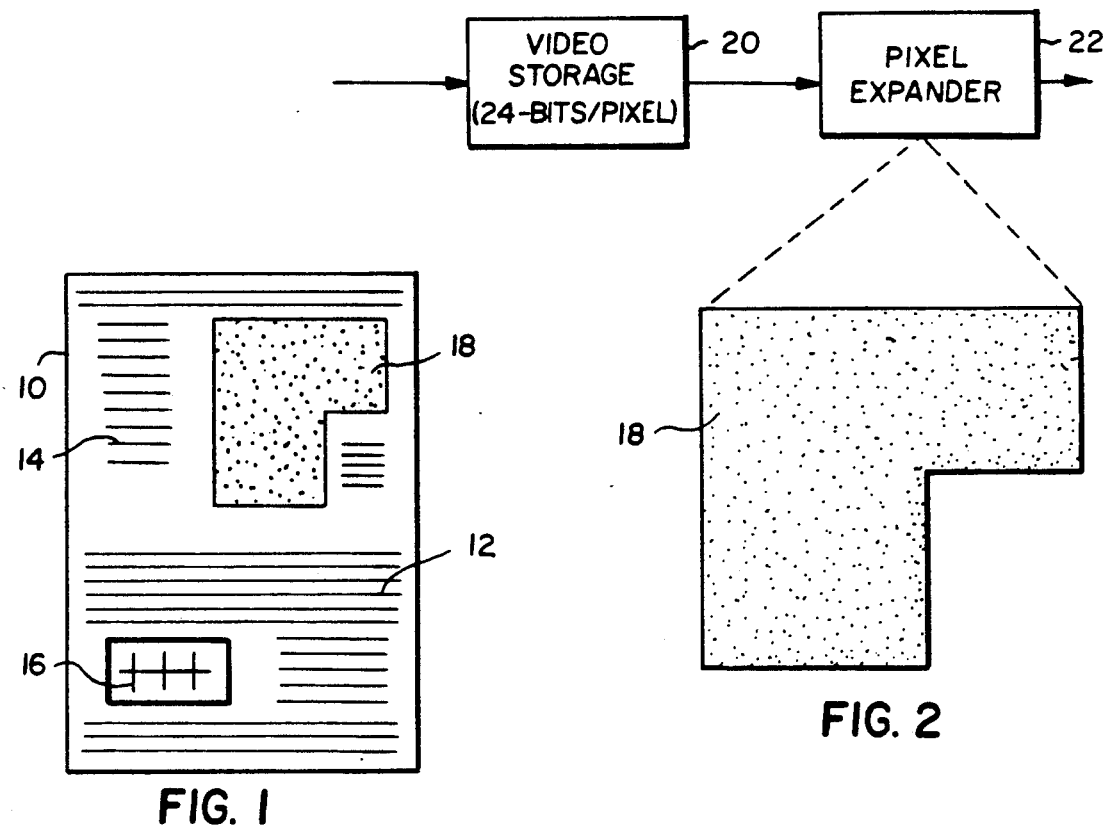
FIG. 1
FIG. 2
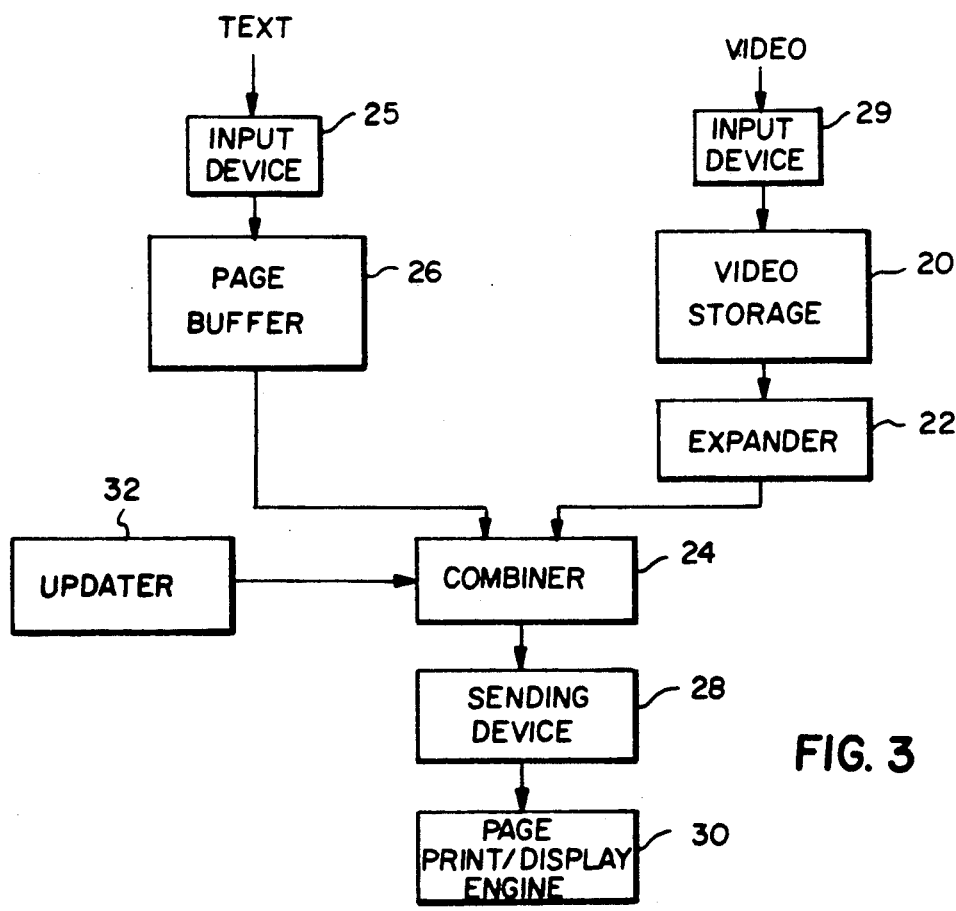
FIG. 3

EFFICIENT DATA STORAGE SYSTEM FOR GRAY-SCALE PRINTERS

BACKGROUND OF THE INVENTION

1. Field of the Invention

This invention relates, in general, to hard-copy printers and, more specifically, to data storage systems for gray-scale printers capable of accepting different types of input data.

2. Description of the Prior Art

Hard-copy printers, whether of the electrophotographic, impact, ink jet, or other type, are becoming more versatile and many now have the capability of printing pictures, or pictorial information, as well as text, graphics, and like images. With a high level page description language, such as PostScript which is a registered trademark of Adobe Systems Incorporated, it is possible to specify the location of a pictorial image on the page of the printed hard-copy. In some instances, it is also possible to select a portion of a picture for enlargement or reduction and inclusion on the page. As a general rule, these pictures are input from electronic data originating from video sources such as video cameras, video tape recorders, or picture scanners.

There is one basic difficulty which presents a problem when merging text and graphics from one source of data with pictorial information from another source of data. The text information must be interpreted from the page description language and loaded into a page memory system in order that it can be reproduced on a printed page by the printer electronics. While some devices have less than a full page of memory dedicated to the printing buffer, there are certain advantages to a complete page buffer in electronic hard-copy printers. The size of the page buffer is dependent upon several factors, including the size of the page, the resolution desired, the number of colors to be printed, and the level of color graduations, or the gray-scale increment. While the capacity of the page buffer can be significant, it is well within the state of the art to provide such capacity for text and graphics information in a page buffer.

Storing video or pictorial information in a page buffer presents the bigger challenge. Pictorial data contains much more information than text information and thus requires more memory, or bits, to sufficiently store the data. When placing the picture in the same page buffer which is used to store the text for the page, a very large amount of memory must be used. Text can adequately be stored at a relatively low bit level per pixel, with one to three bits usually being sufficient. This is primarily because a wide range of colors and gray-levels are not needed to faithfully reproduce the desired text and most graphics information. On the other hand, pictures often need four or more bits per pixel for each color to adequately reproduce the picture content. When translating this into the page buffer, the higher bit level requirements of the pictorial data uses a considerable amount of memory space.

In addition to the memory requirements necessitated merely because of the higher bit requirements of pictorial information, the utilization of a page buffer to store pictorial information is also inefficient because the resolution of the video source is not usually sufficient to put meaningful data in all of the pixels of the page buffer delegated to the picture. This is especially true when the picture is enlarged for insertion into the page. The original video can have a resolution of about 512 horizontal and vertical pixels for the entire picture. Since the page buffer can have much higher resolution, such as 400 dpi (dots per inch), positioning the picture in an area of the page bounded on each side by 2,000 pixels (5 inches) means that about one-sixteenth of the memory in the page buffer will be representing actual pictorial information and the other memory locations will contain processed information from the original video signal.

The problems associated with storing and combining text/graphics information with pictorial information are addressed by several issued patents. U.S. Pat. No. 4,553,172, issued on Nov. 12, 1985, discloses a system whereby picture and character information is separately processed and converted into digital values at different bit levels. The color pictures use 32 bits, and the characters use 25 bits. The large number of bits for the characters is produced by combining several character data words or signals together to form a combined data word which is similar in size to the color picture data word. Both types of data are stored and recalled from memory as 32-bit words. While separate processing of text and pictorial information is shown, the storage system in this patent is much different than that of the present invention.

U.S. Pat. No. 4,618,846, issued on Oct. 21, 1986, discloses a data coding system. Column 1 of the patent recognizes that three or four bits per color are necessary to represent pictorial information, and that fewer levels, even one bit, can be used to represent text on a newspaper page. While recognizing the required bit levels for representing different types of data, the data coding system of the patent is not similar to the teachings of the present invention.

U.S. Pat. No. 4,626,902, issued on Dec. 2, 1986, provides some background information on the resolution needed to adequately represent "literal" text components and pictorial components. In this case, the pictorials are half-toned and may require finer pixel resolutions to properly represent the data for the picture.

Therefore, it is desirable and it is an object of this invention, to provide a printer having a memory system which makes efficient use of the memory space taking into consideration the requirements of the data being represented and the intermediate and ultimate resolution which must be maintained to preserve data quality.

SUMMARY OF THE INVENTION

There is disclosed herein a new and useful system for producing a page output from a hard-copy printer, page display terminal, or like device. The system makes use of the fact that it is advantageous to store data in its most efficient manner until it must be changed in form for merging and outputting with other data types. Then, the changes are made only for a portion of the data at a time to conserve memory space. This is possible with the present invention even though a page buffer containing data for every pixel in the page is desired and expected by the output electronics. The modified page buffer of this invention provides a unique means for maintaining the quality of pages containing merged data of different types, bit levels, and pixel resolutions without enlarging the memory size of the page buffer.

According to the specific embodiment of this invention, page description data is analyzed and converted to the text and line graphics information or data defined therein. This data is interpreted and processed with a contour suppressor, if needed, and stored as two bit per pixel data in a page buffer. The portion of the description data which specifies the size and content of pictorial information in the page is used to control the storage of a frame of video information in a frame storage memory or buffer. This video information is stored at the pixel resolution of the originating video signal, which can be 512 pixels per entire frame, horizontal and vertical. The bit level of this storage is comparable to the resolution available in the video signal and, in this embodiment, 24 bits are used to specify the exact color of each pixel.

Although pixel resolution can be defined in dots per inch (dpi) for full size printed pages, the "dpi" resolution of a 512×512 video frame is somewhat vague since the size of the printed video frame is not specified. Normally, however, the frame is printed in an area which contains more than 512 pixels horizontal and vertical. Thus, the resulting dpi of the video frame is much lower than 512 dpi. Where "resolution" is used herein in reference to a video frame, it is the equivalent resolution produced by the 512 pixel information in the expanded form for printing. For example, a 512 line video frame printed in a 3" square produces an equivalent dpi "resolution" of 512/3, or 176.7 dpi. Therefore, the dpi of the video signal data is regarded as being stored at 176.7 dpi, which is much less pixel per inch resolution than the graphic and text data.

In order to combine the video data with the text/graphics data and store the combined data in the page buffer for use by the output device, or printhead, the data in the frame storage memory is converted to four-bit per pixel data for the same pixel resolution as used in the page buffer. This data is temporarily stored in an intermediate band buffer and then transferred to a combining band buffer at the correct time to align properly with the two-bit text/graphics data from the page buffer. The locations of the bit level transitions in the band buffer are written to a location table which is accessed during the removal of the data from the band buffer to provide the transition information to the printhead. Two bits and four bits are respectively used for the text/graphics and pictorial information to provide good perceivable image quality in the printed page consistent with reasonable memory requirements.

The system of this invention allows video data to be merged with text/graphics data from a page description language without using the amount of memory space which would be needed to store the pictorial content of the video information at the same resolution in which the high contrast images are stored in the page buffer of the apparatus. Working portions of the different types of data are combined after the page buffer, just in time to be transferred to the output device.

BRIEF DESCRIPTION OF THE DRAWINGS

Further advantages and uses of this invention will become more apparent when considered in view of the following detailed description and drawings, in which:

FIG. 1 illustrates a printed page with various types of images thereon;

FIG. 2 illustrates the original video data and the video data expanded for insertion into the output page shown in FIG. 1;

FIG. 3 is a block diagram illustrating the general concept of the invention;

DESCRIPTION OF THE PREFERRED EMBODIMENTS

Figure 4:
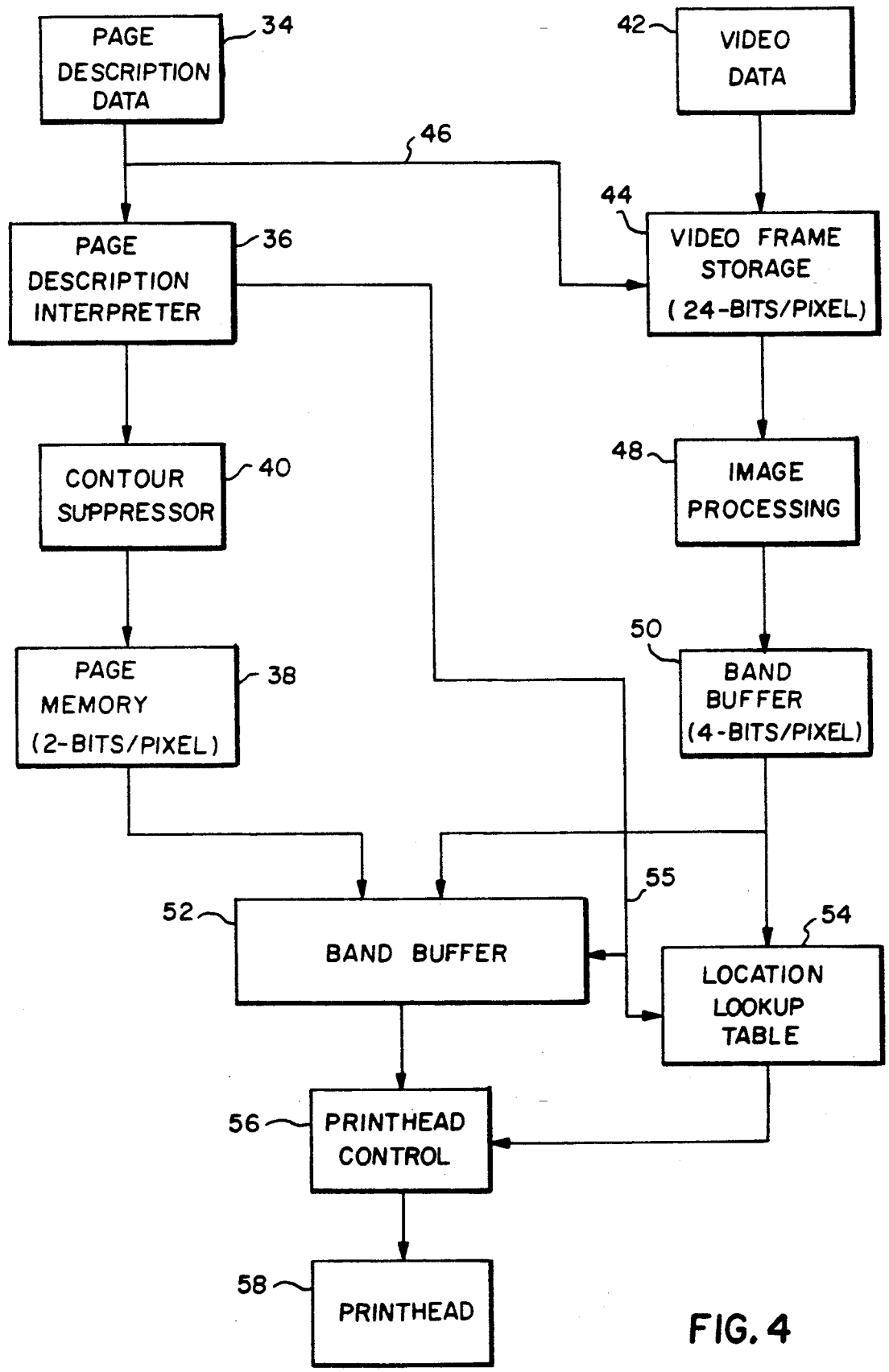
FIG. 4 is a block diagram illustrating a printer memory system constructed according to a specific embodiment of the invention.

Throughout the following description, similar reference characters refer to similar elements or members in all of the figures of the drawings.

Referring now to the drawings, and to FIG. 1 in particular, there is shown a printed page 10 containing various types of images printed thereon. Image areas 12 and 14 represent text images, and image area 16 represents line graphics images. Both the text and line graphics image areas are characterized by high contrast between the printed portion and the background area of the page. Image area 18 represents pictorial information such as would normally be generated from a continuous-tone photograph or video signal. The pictorial information in image area 18 does not have the high contrast characteristics inherent in the text and line graphics areas. As can be seen from FIG. 1, the various types of information are combined or merged together onto the same output page to form a composite image which has been printed onto the page 10 by a suitable process, such as electrophotographic printing.

There are two parameters of specific importance in describing the present invention. One is the pixel resolution of the image data displayed on the page 10. This corresponds to the number of changes which can occur in the data across the page, and also corresponds to the dpi (dots per inch) of the printed page. In the specific embodiment of this invention, the printed page 10 is reproduced with a dpi of 400 in both the vertical and horizontal directions. Therefore, to cover an entire 8½"×11" surface, almost 1½ million pixels would be needed. In addition to the pixel resolution, each pixel may have different gray levels or degrees of color intensity within the pixel. A range of four different intensity graduations would require two memory bits, light graduations would require three memory bits, and so on. Therefore, as can be seen, the memory requirements for a page of data are affected by the pixel resolution and by the bit level, or gray scale, of each individual pixel. Assuming the 400 dpi case with a bit level of 4 (16 gray levels), nearly 18,000,000 bits of memory would be needed to store data for the complete page in a page buffer when three color components are used.

Experience and testing have shown that the high contrast areas such as text and line graphics can be represented faithfully by a lower bit level for each pixel than pictorial information. For shading applications, a halftone dither is used to generate more color levels. Satisfactory reproductions can be made when the text areas 12 and 14, and the graphics area 16, are represented by less than four bits per pixel in the memory device, or page buffer. In addition, the pictorial image area 18 can be represented faithfully when the bit level is at least four bits. In the specific embodiment of the invention disclosed herein, the text and graphics areas are stored in the page buffer at a two-bit level, and the image area 18 which represents pictorial information is stored at a four-bit level. Both bit levels are for a separate color component. A similar concept can be realized if the text graphics information is using higher resolution (400 dpi) luminance and lower resolution (100 dpi)

color data. This requires an LUT between the page memory 38 and the band buffer 52 when the color separation page is outputted. The LUT is going from L*a*b* input to CMYK output (4 bits).

The data on page 10 (FIG. 1) which represents text and line graphics usually can be derived from a page description representation of the data generated by an external computer or work station. The pictorial image information is usually obtained from another source and, in many cases, the direct input of a video signal from suitable apparatus is used to obtain the pictorial information. FIG. 2 illustrates the relationship between the original video data and the data expanded for insertion into the page shown in FIG. 1. As shown in FIG. 2, a device for video storage 20 is used to store the video signal in the format received from the video generating apparatus. Assuming a color signal, 24 bits per pixel can be used to fully represent the colors in the video signal. The number of pixels required depends on the resolution of the video signal delivered to the storage system 20. With conventional NTSC video signals, the horizontal and vertical resolution of the video signals is approximately 512 pixels per picture, or video frame, which translates to a total pixel count of about 262,000 pixels. However, 512 pixels only fill the equivalent of 1.28 inch of space in a full sized page buffer and, therefore, additional processing must be utilized to use the original video signal for data stored in the page buffer when the picture will be printed larger than aproximately 1.28 inch.

The pixel expander 22 effectively interpolates the pixels contained in the storage device 20 to the same pixel resolution as that used in the page buffer by use of bilinear interpolation techniques. Thus, the image area 18 is produced with a pixel per inch suitable for use with the page buffer and, according to the specific values used in this embodiment, would have a pixel-per-inch value of 400. As should be evident, and assuming that the area 18 is several inches across, the number of pixels contained in the area 18 is much greater than the number of pixels originally stored in the video storage device 20. It is the location and timing of the video storage and expanding signals which is used uniquely by this invention to conserve memory space in the page buffer consistent with perceivable high quality, hard-copy reproductions. In other words, the large memory capacity needed to store the full-size pictorial information for area 18 into the page buffer is eliminated by the techniques of this invention by not storing the expanded pictorial information in the page buffer in a conventional manner. The video storage device 20 can also contain multiple video images.

FIG. 3 is a block diagram illustrating the general concept of the invention. Input device 25 receives text information and stores this information in the page buffer 26. Normally, the page buffer 26 would have sufficient memory to have each pixel on the reproduced page represented by at least one bit in the buffer 26, with two bits being desirable in many cases. The input device 29 connects the video signal to the video storage device 20. Data from the video storage device 20 is expanded by the expander 22 and applied to the combiner 24 along with the data from the page buffer 26. The combiner 24 functions to properly combine the two types of data in the form needed for transfer, by the sending device 28, to the print engine 30 associated with the electronic data during printing. The print engine could be an electrophotographic printing device or other conventional means for printing a hard copy output from electronic data. In addition, the output could be on a display device, such as a terminal using a cathode ray tube, instead of on a hard copy material.

Because the data in the combiner contains less than a full page of data, additional data must be transferred to the combiner 24 from the buffer 26 and the expander 22 during the printing or reproducing operation. The updater 32 performs this function and keeps the combiner properly filled with data for use by the output device. As can be seen from the overall block diagram of FIG. 3, the video information is stored separately from the page buffer and then expanded into the resolution of the page buffer and merged in the combiner 24 for use by the output device. This storage of the video information separate from the page buffer, and combining the video information after expansion to the proper resolution with information from the page buffer at the appropriate time, conserves memory space without decreasing the quality of the printed page.

FIG. 4 is a block diagram illustrating a printer memory system constructed according to a specific embodiment of the invention. Input data 34 from a page description language source is applied to a page description interpreter 36 which converts the data into the bit form necessary for storage in the page buffer or memory 38. Although it is is not necessary for the system of this invention to function, a contour suppressor 40 is used in this embodiment to reduce density contouring due to lack of available gray levels in areas of the printed page which use graphic halftone shading. Such contouring can become evident when a small bit level is being used to store and represent the data for the page.

Video data 42, originating from an appropriate source, is applied to the video frame storage device 44 for initial storage into memory. Device 44 can be a conventional "frame grabber" which captures one frame of a video signal and stores it into memory at the full resolution and at a bit level sufficient to represent the full color range of the frame. As peviously discussed, normal resolution video signals contain about 262,000 pixels for the complete frame and the complete range of color components can be represented by 24 bits, which usually is arranged into three eight-bit bytes representing the chrominance and luminance of the signal. Even higher definition video would limit the need to have storage for more than one million pixels in device 44, whereas the page buffer would routinely need more than a seven million pixel storage capacity in most applications. The page description data 34 also is connected to the storage device 44 across line 46 for coordination and control of the video signal, since the position and size of the pictorial information from the video information is most likely described and defined by the page description data.

The image processor 48 suitably processes the video information in the storage device 44 for use by the remaining portions of the system shown in FIG. 4. Processing, such as unsharp masking, bilinear interpolation, and gray-level halftoning, along with contour suppression if needed, can be accomplished by the image processor 48. All of these techniques can be performed by various circuitry and/or algorithms well known by those skilled in the art. The bilinear interpolation expands the data into a sufficient number of pixels to match the pixel resolution contained in the page buffer or memory 38. In other words, the image processor 48 conditions, during printing, the fundamental data stored in the storage device 44 at a smaller pixel resolution for compatibility with the pixel information stored in the page memory for the text and high contrast graphics.

Because of time constraints in processing the video signal in processor 48, a band buffer 50 may be used to temporarily or intermediately store enough processed information so that downstream flow of the data can be maintained in an orderly fashion. A band buffer is a memory device which stores one or more lines of data representing a line to be printed in the hard-copy output page. Typically, a band buffer may contain eight or ten lines of information, but, in any event, it contains substantially less lines than the complete page memory. A band buffer containing only one line of data would be the specialized case of a band buffer being synonymous with a line buffer. In some applications, it may be desirable to make the band buffer 50 large enough to contain all the stored pixels for the picture. This would eliminate the need for any real time processing of the video information while supplying data from the buffer 50.

The image processor 48 converts the stored video information into the proper pixel resolution at a four-bit intensity level or scale, thereby providing 16 different intensity graduations. As already stated herein, the four bits per pixel level is sufficient to adequately represent pictorial information to be printed on a hard copy output, consistent with a reasonable amount of memory storage. This is especially true when the four bits per pixel level is used in a more uniform color space and multiple pixels can be used to form a halftone output. Even though the band buffer 50 contains enough data for each of the pixels to be represented in the picture, the different bit levels of the pixel information in band buffer 50 and the page buffer 38 must be taken into account.

The band buffer 52 received both two-bit and four-bit information from the respective channels. This is coordinated with the data 55 from the page description interpreter 36 to specify the location at which two-bit and four-bit data is loaded into the band buffer 52. This location is stored in location lookup table 54 for later use when the data in band buffer 52 is transferred by the printhead control device 56 and ultimately to the printhead 58. In other words, the system of FIG. 4 loads both two-bit and four-bit data into the band buffer 52, keeps track of the locations in which this data is located, and advises the printhead electronics whether the data being transferred to it is in the two-bit or four-bit foam. This is true even through, for convenience in design, each pixel memory in band buffer 52 is in fact four bits deep. In the text case, the two higher bits contain the data while the two lower bits may be zero. In the case of pictorial information, then all four bits are used for data. The lookup table 54 can also be used to record whether the text/graphics data is in the foreground or background.

Figure 5:
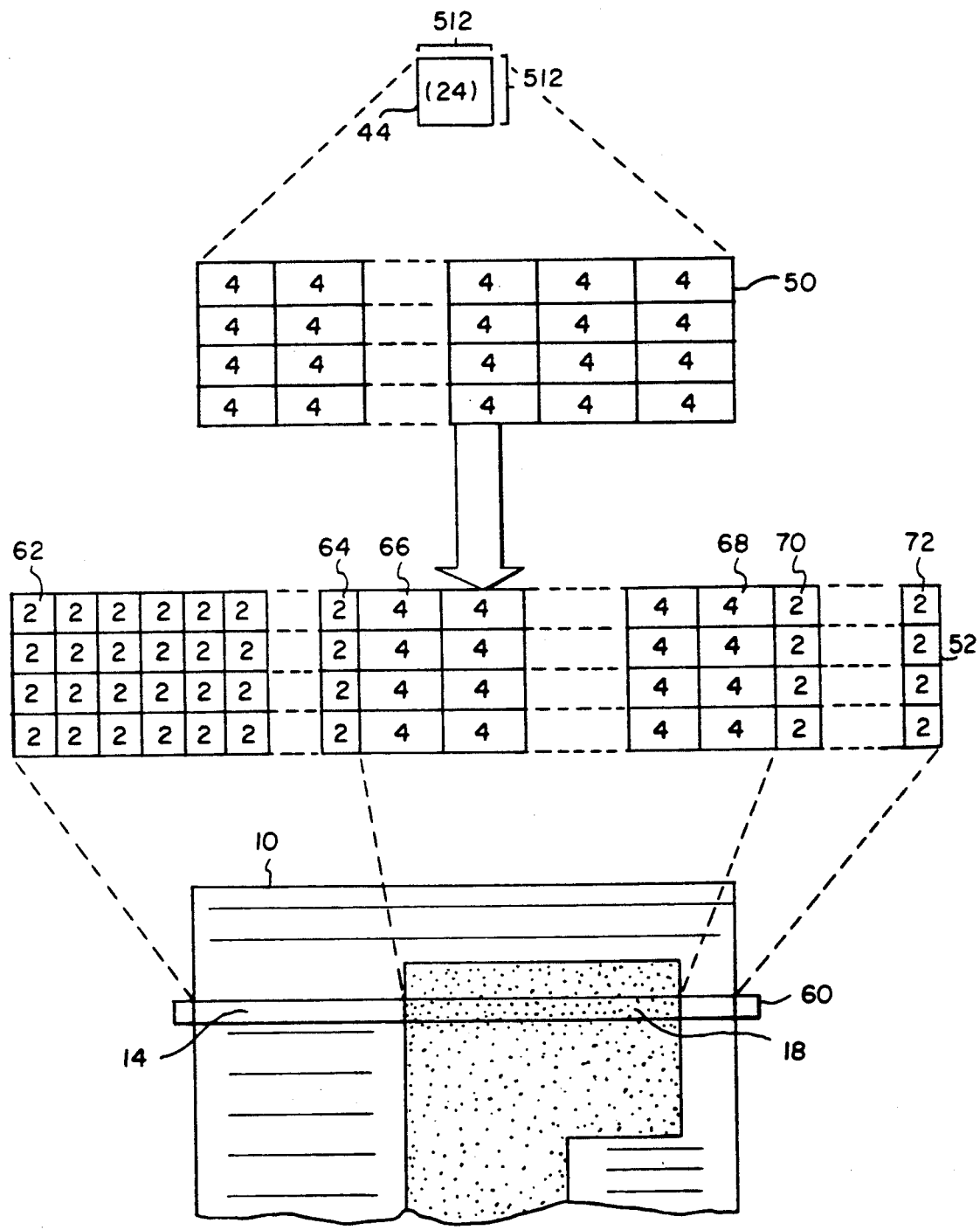
FIG. 5 is a diagram useful in describing the function of the system shown in FIG. 4.

FIG. 5 is a diagram illustrating the organization of data in the devices 44, 50, and 52 of FIG. 4. According to FIG. 5, the frame storage device 44 contains data arranged with 512 pixels, both horizontally and vertically, for the entire picture. Each pixel is defined by a 24-bit quantity. This data is expanded by the image processor to the band buffer 50 where each box represents a pixel in a line and the number in the box represents the bit level for data stored for that pixel. As shown in FIG. 5, the band buffer 50 stores, during printing, the video information at a four-bit level for each pixel of the picture and for each color component contained in the 24-bit representation during printing. In addition, the number of pixels represented in the band buffer 50 across horizontally is equal to the actual horizontal resolution of the finished printed page 10 in full size. In other words, the number of pixels horizontally across the band buffer 50 is equal to the pixels needed to produce the appropriate dpi in the output page. The band buffer 50 shown in FIG. 5 includes data for four lines in the overall page. Under control of the system controller, the data in buffer 50 is merged into the band buffer 52.

Band buffer 52, shown in FIG. 5, represents the area 60 shown across page 10. The dashed connecting lines indicate what portions of the area 60 correspond directly to the data in the band buffer 52. Pixel data from pixel locations 62 to pixel location 64 represents text area on page 10 and is stored in the two-bit level as indicated. Pixel location 66 to pixel location 68 is stored in the band buffer 52 with four-bit data since it represents the pictorial information 18 shown on page 10. Similarly, pixel location 70 through pixel location 72 represent a text area on the page 10 and contain two-bit data. As previously indicated, convenience of design may dictate that the buffer 52 contain all four-bit pixel locations, with only two bits effecively being used when two-bit data is stored.

Band buffer 52 contains information for four lines in the page 10, and, therefore, it requires updating of the data periodically to provide data for the entire page 10. In addition to storing the data at different bit levels, the locations of the different bit levels must be recorded or stored in the lookup table 54 (FIG. 4) since the printing electronics must know, when it is obtaining data, whether the data is in two-bit or four-bit form so that it may handle the data appropriately with the correct bit number and with the correct printing sequence for the type of data represented. Additional processing and/or halftoning may be accomplished by the printhead control circuitry to appropriately produce the desired pattern or color from the information contained in the memory cells of the band buffer 52.

The system of this invention provides a convenient method for saving memory space when coordinating and merging pictorial information into text and graphics information which will be printed on a hard-copy output page or displayed in page format. The system herein considers the actual bit content of the information in the video image and stores that appropriately at a convenient time in the system operation, and recalls that information for enlargement into a different pixel resolution just in time to merged with text and graphics information of the same pixel resolution.

One possible modification would involve making the memory capacities of the page buffer 38 and the band buffer 50 dynamically changeable to meet the overall memory requirements. With such a system, the memory allocated to the band buffer 50 would be dependent upon the size of the picture to be printed. Excess memory would be taken from the page buffer 38, if needed, and a lowering of the bit level for storing text/graphics data would be needed. For example, if the band buffer which stores the video data is not large enough for the current application, the bit level for storage in the page buffer would be lowered to 1 bit per pixel to free some memory for use in the band buffer.

It is emphasized that other changes may be made in the above-described system without departing from the teachings of the invention. It is intended that all of the matter contained in the foregoing description, or shown in the accompanying drawings, shall be interpreted as illustrative rather than limiting.

I claim as my invention:

1. Apparatus for producing a page output from electronic input data, said apparatus comprising:
   means for storing up to one complete page of one type of input data at a first pixel per inch resolution;
   means for separately storing another type of input data at substantially less pixel per inch resolution than said first resolution;
   means for separately storing the location of the two types of input;
   means for expanding said stored other type of data to the same resolution as said first resolution;
   means for combining said stored one type of data with said expanded other type of data; and
   means for sending the combined data to an output device.

2. The apparatus of claim 1 wherein the one type of data is stored at a first bit level, the other type of data is stored at a second bit level, and the second bit level is greater than said first bit level.

3. The apparatus of claim 2 wherein the total bit-pixel storage capacity of the means for storing the one type of data is several times the total bit-pixel capacity of the means for storing the other type of data.

4. The apparatus of claim 1 wherein the expansion is performed by bilinear interpolation.

5. The apparatus of claim 1 wherein the combining means includes a line buffer containing at least one line of pixel data derived from the one type of data and also from the expanded other type of data, with the data arranged in the line buffer in the order it will occupy in a line on the output page.

6. The apparatus of claim 5 wherein the line buffer is updated with the one type of data and with the expanded data for the entire output page.

7. The apparatus of claim 5 including means for indicating where the line buffer contains data of the one and of the expanded types.

8. The apparatus of claim 5 wherein the expanded data has a bit level per pixel which is greater than the bit level per pixel of the one type of data.

9. Apparatus for producing a page output from electronic input data, said apparatus comprising:
   means for inputting at least two different types of data;
   first means for storing up to a page of data of the first bit level per pixel;
   second means for separately storing data of the second type at a second bit level per pixel, with the number of pixels stored in the second storage means being less than the number of pixels stored in the first storage means, and with said second bit level being greater than said first bit level;
   third means for storing the location of data of the first and second type;
   means for expanding the number of pixels of the second data type into a greater number of pixels at a reduced bit level;
   means for combining a portion of the page data of the first data type with a portion of the expanded data of the second data type;
   means for updating the combined data for a complete page of data; and
   means for sending the updated and combined data to a page output device.

10. The apparatus of claim 9 wherein the apparatus also includes an intermediate storage means and means for storing the expanded data in the intermediate storage means.

11. The apparatus of claim 9 wherein the expanded data has a bit level per pixel which is greater than the bit level per pixel of the first data typed.

12. The apparatus of claim 9 wherein the data of the first type is data in page description format, the data of the second type is video information, and the first bit level is two bits per pixel.

13. The apparatus of claim 9 wherein the number of pixels stored in the first storage means is greater than seven million and the number of pixels stored in the second storage means in less than one million.

14. The apparatus of claim 9 wherein the reduced bit level of the second data type equals four bits per pixel.

15. The apparatus of claim 9 wherein the capacities of the first and second storage means are dynamically changeable to meet the overall memory requirements of the stored data.

16. The apparatus of claim 10 wherein the intermediate storage means has a capacity to store only an amount of data which is substantially less than a full page of data.

17. The apparatus of claim 10 including means for indicating to the page output device where the intermediate storage means contains data of the first type and expanded data of the second type.

18. The apparatus of claim 10 wherein the intermediate storage means contains a mixture of data having two and four bit levels, with the two bit data representing the first data type and the four bit data representing the first data type and the four bit data representing the second data type.

19. A storage method for input data to an electronic, gray-scale, printer, said method including the steps of:
   inputting first data representative of high contrast images;
   inputting second data representative of pictorial images;
   inputting third data representative of the locations of the first and second data;
   storing the first data at a first bit level and at a first pixel inch resolution;
   storing the second data at a second bit level and at a second pixel per inch resolution, said first bit level being lower than said second bit level and said first pixel resolution being higher than said second pixel resolution;
   expanding the stored second data to the same pixel resolution as said first data;
   combining portions of the first and the expanded data together;
   sending the combined data to page output device; and
   repeating the expanding, combining, and sending steps until the complete page has been sent to the page output device.

* * * * *